US008931402B2

(12) United States Patent
Chameroy et al.

(10) Patent No.: US 8,931,402 B2
(45) Date of Patent: Jan. 13, 2015

(54) VERTICALLY DEPRESSIBLE JOINT AND PRESSURE-COOKER PROVIDED WITH ONE SUCH JOINT

(75) Inventors: Eric Chameroy, Veronnes (FR); Michel Pierre Cartigny, Mirebeau-sur-Beze (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 13/520,622

(22) PCT Filed: Jan. 10, 2011

(86) PCT No.: PCT/FR2011/050035
§ 371 (c)(1),
(2), (4) Date: Sep. 26, 2012

(87) PCT Pub. No.: WO2011/083284
PCT Pub. Date: Jul. 14, 2011

(65) Prior Publication Data
US 2013/0068113 A1 Mar. 21, 2013

(30) Foreign Application Priority Data

Jan. 11, 2010 (FR) ...................................... 10 50144

(51) Int. Cl.
*A23B 4/052* (2006.01)
*A47J 27/08* (2006.01)
(52) U.S. Cl.
CPC .......... *A47J 27/0804* (2013.01); *A47J 27/0806* (2013.01)
USPC ........................................................ 99/352

(58) Field of Classification Search
USPC .............................. 99/352, 339, 403; 219/440
See application file for complete search history.

(56) References Cited

U.S. PATENT DOCUMENTS

| 2,399,115 | A | * | 4/1946 | Hansen et al. | 220/298 |
| 2,598,220 | A | | 5/1952 | Burkhardt | |
| 2,600,714 | A | | 6/1952 | Wenscott et al. | |
| 2,636,634 | A | * | 4/1953 | Flubacker | 220/300 |
| 2,652,170 | A | * | 9/1953 | Lotter et al. | 220/290 |
| 2,787,400 | A | * | 4/1957 | Fritsch | 220/378 |
| 4,276,990 | A | * | 7/1981 | Chiodo | 220/203.12 |
| 5,121,852 | A | * | 6/1992 | Wilkes | 220/203.12 |
| 5,229,563 | A | * | 7/1993 | Isogai et al. | 219/735 |
| 5,297,473 | A | * | 3/1994 | Thelen et al. | 99/337 |

(Continued)

FOREIGN PATENT DOCUMENTS

FR 2811398 A3 1/2002
WO 2008011768 A1 1/2008

*Primary Examiner* — Dana Ross
*Assistant Examiner* — Renee L Miller
(74) *Attorney, Agent, or Firm* — The Webb Law Firm

(57) ABSTRACT

Provided is a sealing gasket for a cooking utensil, the utensil includes a vessel and a lid; at least one first locking member and at least one second locking member, the sealing gasket being designed to be interposed between the lid and the vessel and being characterized in that it is designed so that, while the lid is docking with the vessel, said sealing gasket fits over the top rim and comes into contact with said lid and with said vessel while the first locking member is situated at a first height ($h_{61}$) greater than or equal to the height ($h_8$) at which the second locking member is situated, and is then depressed under the weight of the lid alone to bring the first locking member to a second height ($h_{62}$) that is less than the height ($h_8$) at which the second locking member is situated.

16 Claims, 4 Drawing Sheets

(56) References Cited

U.S. PATENT DOCUMENTS

| | | | |
|---|---|---|---|
| 5,687,870 A * | 11/1997 | Carlile et al. | 220/316 |
| 5,927,183 A * | 7/1999 | Lee | 99/337 |
| 6,116,151 A * | 9/2000 | Fickert et al. | 99/337 |
| 6,695,319 B1 * | 2/2004 | Anota et al. | 277/628 |
| 6,877,633 B2 * | 4/2005 | Niese | 220/315 |
| 7,637,206 B2 * | 12/2009 | Seurat Guiochet et al. | 99/337 |

* cited by examiner

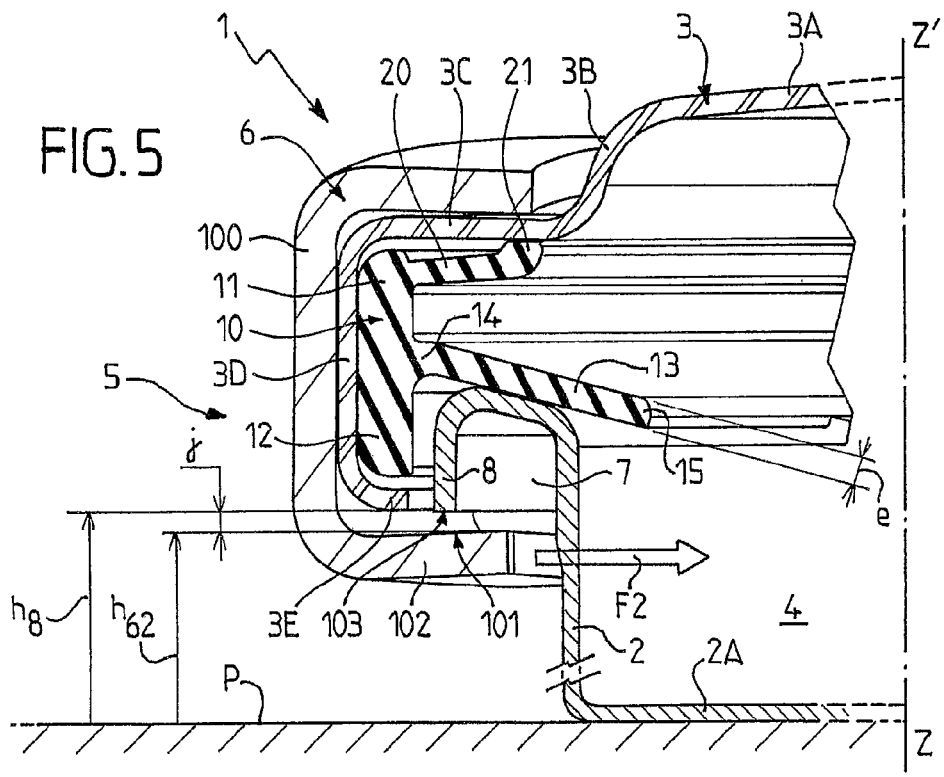
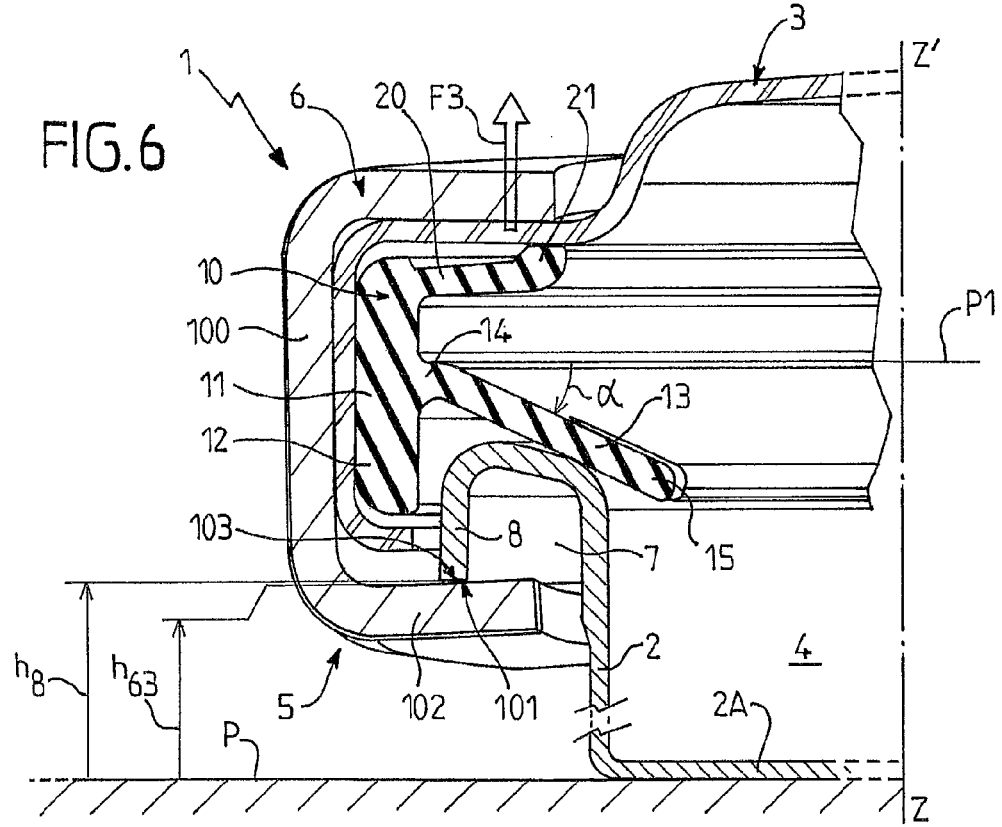

VERTICALLY DEPRESSIBLE JOINT AND PRESSURE-COOKER PROVIDED WITH ONE SUCH JOINT

TECHNICAL FIELD

The present invention relates to the general technical field of utensils for cooking food under pressure in an atmosphere full of steam, such as pressure cookers.

The present invention relates more particularly to sealing gaskets designed to be put in place in such utensils so as to provide sealing between the inside and the outside of the utensil when it is in operation.

The present invention thus relates to a sealing gasket for a cooking utensil for cooking food under pressure, said utensil comprising:
- a vessel and a lid that is designed to be mounted on said vessel to define a cooking enclosure;
- locking means making it possible to hold the lid on the vessel, said locking means comprising at least one first locking member that is secured to or integral with the lid and at least one second locking member that is secured to or integral with the vessel, the first locking member being designed to be engaged under the second locking member, after the lid has been placed on the vessel, in order to hold said lid on said vessel;
- the sealing gasket being designed to be interposed between the lid and the vessel in order to seal the cooking enclosure.

The present invention also relates to a cooking utensil for cooking food under pressure, which utensil is equipped with or is suitable for being equipped with a sealing gasket of the invention.

PRIOR ART

Regardless of the type of cooking utensil for cooking food under pressure, it is already known to use a sealing gasket, in particular made of an elastomer material, in order to provide sealing between the inside and the outside of the cooking enclosure while the utensil is being brought up to pressure and throughout the cooking cycle.

To this end, use is generally made of a gasket of the rope-seal type, or indeed of a gasket of the lip-seal type, which is placed in the lid in such a manner that, while the lid is being put in place on the vessel of the utensil, said gasket can come to bear against the vessel and seal the utensil.

As a general rule, putting the lid in place on the vessel leads to the gasket being compressed, which is necessary in order for it to provide its sealing function.

Unfortunately, although known gaskets are generally satisfactory, they sometimes suffer from certain drawbacks.

The presence of such gaskets may, in certain cases, hinder placing or locking the lid on the vessel insofar as said gaskets being compressed can generate mechanical resistance to the placement and locking operations.

In particular, it is observed that it is generally necessary to compress the gasket in a downward vertical movement, by pressing on the lid, and then, while maintaining said vertical compression force, to act on the lid or indeed on control means situated on said lid in order to actuate the mechanical locking members, such as jaws, ramps, a locking bar, or the like, in order to fasten said lid to the vessel.

Unfortunately, such utensil closure with force can expose the gasket, and, to a lesser extent, the locking members, to excessive stresses that can cause them to be degraded by premature wear, or indeed to be deformed, which is naturally detrimental to the sealing of the utensil and to the safety of the user.

In addition, the gasket being compressed and the friction exerted by said gasket against the walls of the vessel or of the lid generates mechanical resistance to the lid being put in place on the vessel, which reduces the comfort of use of the utensil.

Such closure under stress also increases the risk that the user might accidentally tip the utensil over and tip out its contents at the time of closure, in particular if said closure takes place while the utensil is disposed on a narrow or slippery support, such as a work surface or a stovetop.

In addition, the often uneven compression of the gasket during the closure may lead to poor horizontal positioning of the lid relative to the gasket, and therefore to poor operation of the locking members, which sometimes requires the user to make several attempts at putting the lid in place before obtaining satisfactory placement thereof.

SUMMARY OF THE INVENTION

Objects assigned to the invention are thus to remedy the above-mentioned drawbacks and to propose a novel sealing gasket for a cooking utensil for cooking food under pressure that, while procuring good sealing of the cooking enclosure, makes it possible to place and to lock the lid on the vessel particularly simply, intuitively, and safely.

Another object assigned to the invention is to propose a novel sealing gasket that is particularly easy to fit.

Another object assigned to the invention is to propose a novel sealing gasket that is of simple and robust structure and that is inexpensive to manufacture.

Another object assigned to the invention is to propose a novel sealing gasket that imparts improved reliability, improved longevity, and improved operating safety to the cooking utensil.

Another object assigned to the invention is to propose a novel cooking utensil for cooking food under pressure that can be closed in particularly easy, intuitive, and safe manner with very little effort.

Another object assigned to the invention is to propose a novel cooking utensil for cooking food under pressure that presents good ergonomics and that offers excellent safety guarantees while it is being handled.

The objects assigned to the invention are achieved by means of a sealing gasket for a utensil for cooking food under pressure, said utensil comprising:
- a vessel and a lid that is designed to be mounted on said vessel to define a cooking enclosure;
- locking means making it possible to hold the lid on the vessel, said locking means comprising at least one first locking member that is secured to or integral with the lid and at least one second locking member that is secured to or integral with the vessel, the first locking member being designed to be engaged under the second locking member, after the lid has been placed on the vessel, in order to hold said lid on said vessel;
- the sealing gasket being designed to be interposed between the lid and the vessel in order to seal the cooking enclosure, said sealing gasket being characterized in that it is arranged to fit over the top rim of the vessel and is designed so that, while the lid is docking with the vessel, said sealing gasket comes firstly into simultaneous contact with said lid and with said vessel while the first locking member is situated at a height that is greater than or equal to the height at which the second locking member is situated, and is then depressed under the weight of the lid alone sufficiently to bring the first locking member to a height that is less than the height at which the second locking member is situated.

The objects assigned to the invention are also achieved by means of a cooking utensil for cooking food under pressure that is provided with a sealing gasket of the invention.

BRIEF DESCRIPTION OF THE DRAWINGS

Other objects, characteristics and advantages of the invention appear in more detail on reading the following description, and by means of the accompanying drawings, given merely by way of non-limiting illustration, and in which:

FIG. 5 is a section view showing the configuration of the cooking utensil shown in FIGS. 3 and 4 after the locking members have been engaged so as to lock the lid on the vessel;

FIG. 6 is a section view of the utensil shown in FIGS. 3 to 5 after the lid has been locked onto the vessel and once pressure has built up inside the cooking enclosure.

BEST MANNER OF IMPLEMENTING THE INVENTION

Figure 1:
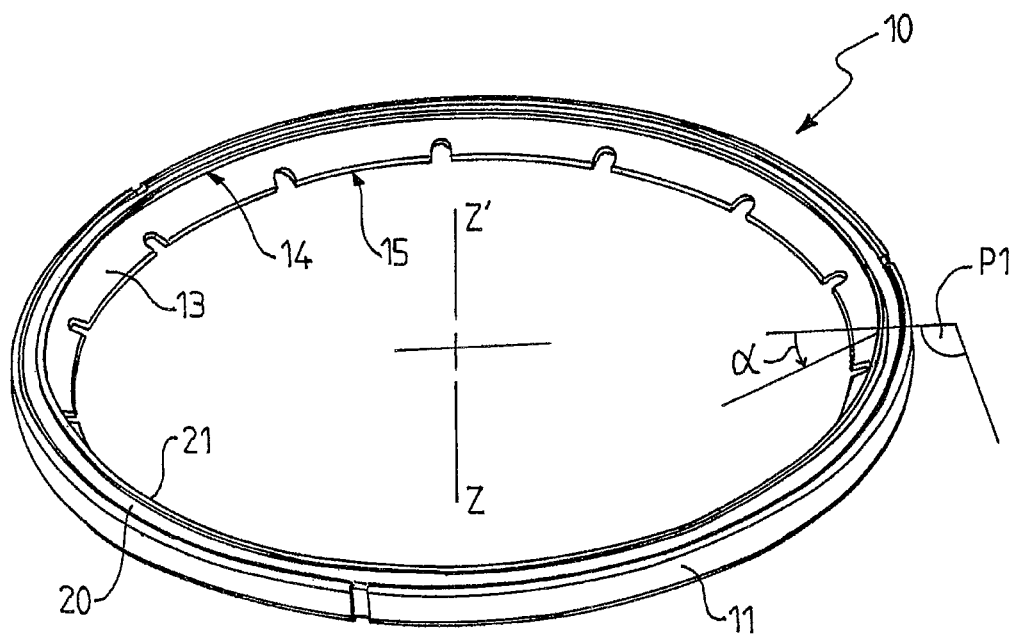
FIG. 1 is a three-dimensional view from above of a variant embodiment of a sealing gasket of the invention.

The present invention relates to a cooking utensil 1 for cooking food under pressure, preferably of the domestic pressure cooker type, said utensil comprising a vessel 2 and a lid 3 that is designed to be mounted on said vessel 2, and more preferably that is designed to be placed on the top rim 7 of said vessel, to define a cooking enclosure 4.

For convenience of description, it is considered below that the cooking utensil 1 is placed on a work surface P that is plane and horizontal, and that the lid 3 is superposed substantially in register with the vessel 2 along the vertical axis (ZZ').

The lid 3 may be provided with a convex and raised central zone 3A that is continued radially outwards, going towards the outside of the lid 3, by a dropped flank 3B, itself followed by an annular flat 3C that is itself continued by a dropped annular edge 3D that is preferably substantially flat and vertical, which annular edge is terminated by an inwardly rolled end segment 3E, as applies in the variant embodiment corresponding to FIGS. 3 to 6.

Naturally, the lid 3 may be of any diameter or of any other implementation shape, and in particular be substantially flat, i.e. have a non-convex central zone 3A, without a dropped flank 3B, and coinciding directly with the annular flat 3C, as applied in the variant embodiment corresponding diagrammatically to FIGS. 7 to 10.

The top rim 7 of the vessel 2 may advantageously have a dropped edge, rolled or stamped from the top end of the vessel. The dished ledge formed by said top rim 7 may, in particular, be substantially horizontal, or, preferably, be inclined slightly towards the inside of the vessel, as shown in FIGS. 3 to 6.

The lid and the vessel are advantageously made of a rigid material, and preferably of metal, suitable for withstanding the heat and the stresses of pressure cooking.

In known manner, the utensil 1 further comprises locking means 5 that make it possible to hold the lid on the vessel and more particularly to prevent the lid and the vessel from coming apart, and especially to prevent the lid from being expelled, when the cooking enclosure 4 is at its operating pressure.

To this end, said locking means 5 comprise at least one first locking member 6 that is secured to or integral with the lid 3 and at least one second locking member 8 that is secured to or integral with the vessel 2, the first locking member 6 being designed to be engaged under the second locking member 8, after the lid 3 has been placed on the vessel 2, in order to hold said lid on said vessel.

Preferably, the cooking utensil 1 thus has a plurality of first locking members 6 and a plurality of corresponding second locking members 8 that are distributed, preferably uniformly, respectively around the periphery of the lid and around the periphery of the vessel, in order to ensure that said lid is fastened in balanced and stable manner to said vessel.

Said locking means 5 may be in different forms without constituting a restriction on the invention, so long as they make it possible to perform, in alternation, locking and unlocking of the lid 3 relative to the vessel 2, and so long as they comprise, for this purpose, a first locking member 6 having a portion suitable for coming into engagement against the bottom portion of a second locking member 8.

In particular, in a variant embodiment that corresponds to FIGS. 3 to 6, said locking means 5 are preferably formed by a system of jaws, comprising two jaws that are diametrically opposite and that are mounted to move at least with a radial component on the lid 3, the first locking means corresponding to a jaw 6 and the second locking member 8 corresponding to the top rim 7 of the vessel.

In another variant embodiment, as shown diagrammatically in FIGS. 7, 8, 9, and 10, the locking means 5 are of the bayonet-fitting type, the first locking member 6 being formed by a plurality of lid ramps, while the second locking member 8 is formed by a plurality of corresponding vessel ramps.

Naturally, it is possible to implement other locking means 5, e.g. locking means having a locking bar or segments, or any other equivalent device involving radial latches that are secured to or integral with the lid and that are designed to be engaged through eyelets provided in the edges of the vessel.

Figure 8:
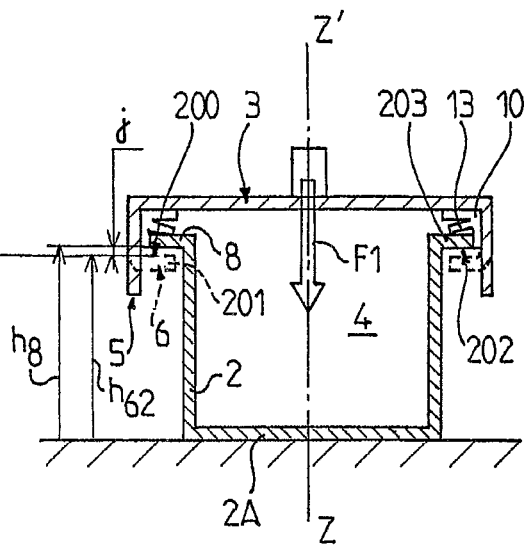

Thus, the cooking utensil 1 of the invention may be provided:

either with locking means 5 having jaws 100, the first locking member 6 being formed by the top face 101 of the inwardly-extending bottom edge 102 of a jaw 100, and the second locking member 8 being formed by the bottom face 103 of the vessel rim 7 or indeed by a ramp provided for this purpose, as shown in FIGS. 3 to 6;

or with bayonet-fitting locking means, the first locking member 6 being formed by the top faces 200 of lid ramps or tabs 201, and the second locking member 8 being formed by the bottom faces 202 of vessel ramps 203, as shown in FIG. 8;

or else with locking means 5 having a locking bar (not shown), the first locking member 6 being formed by the top face of each end of the locking bar, and the second locking member 8 being formed by the bottom face of a fastening lug under which the end of the locking bar may be engaged.

In addition, the cooking utensil 1 of the invention is provided with a sealing gasket 10 that is designed to be interposed between the lid 3 and the vessel 2, in order to seal the cooking enclosure 4, under normal operating conditions, and more particularly when said cooking enclosure 4 is filled with steam at an overpressure (i.e. pressure above ambient) substantially lying in the range 1 kilopascal (kPa) to 200 kPa, and at a temperature lying approximately in the range 100° C. to 135° C.

Figure 3:
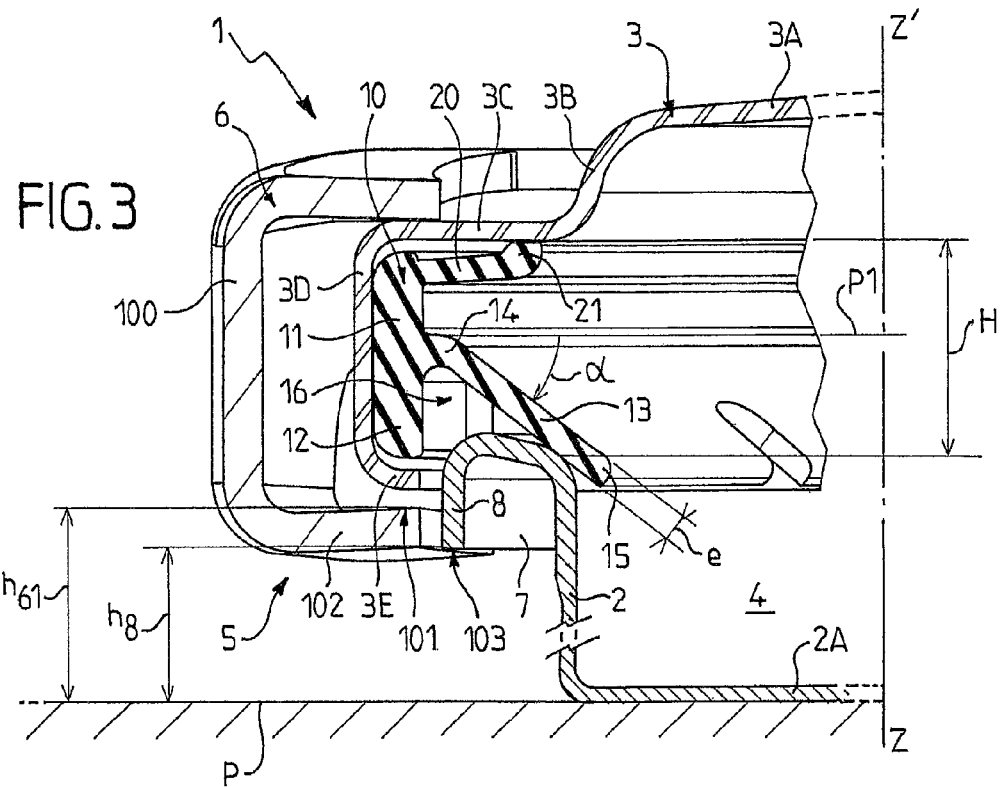
FIG. 3 is a fragmentary section view of a variant embodiment of a pressure cooker of the invention, at the time at which the lid docks with the vessel in such a manner that the sealing gasket comes into contact with said vessel.
Figure 7:
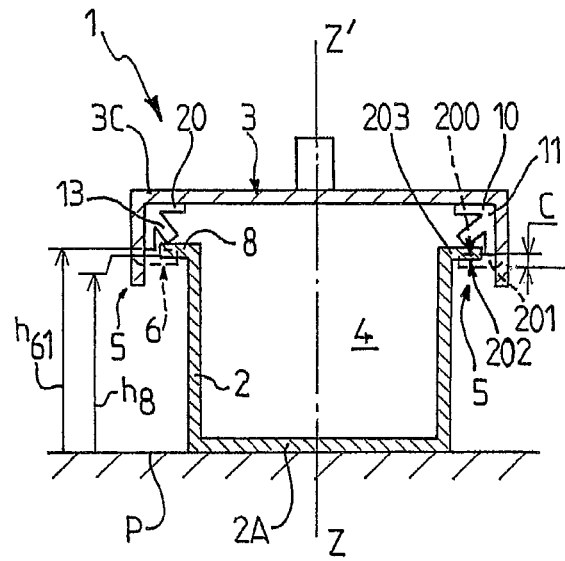
FIGS. 7, 8, 9, and 10 are diagrammatic side views in section showing operation of a variant embodiment of a cooking utensil of the invention, provided with locking members of the bayonet-fitting type, following the steps of docking, or releasing the lid, of engaging the locking members, and of building up pressure inside the utensil.

In accordance with an important characteristic of the invention, the sealing gasket 10 is designed so that, while the lid 3 is docking with the vessel 2, said sealing gasket comes firstly into simultaneous contact with said lid 3 and with said vessel 2 while the first locking member 6 is situated at a first height $h_{61}$ greater than or equal to the height $h_8$ at which the second locking member 8 is situated, as shown in FIGS. 3 and 7, and is then depressed under the weight of the lid 3 alone sufficiently to bring the first locking member 6 to a second height $h_{62}$ that is less than the height $h_8$ at which the second locking member 8 is situated.

The term "height" means the distance to the elements in question from a stationary reference attached to the floor, and more particularly the distance measured along the vertical axis (ZZ') between said elements and the work surface P on which the bottom of the vessel 2A is standing.

Particularly advantageously, the sealing gasket 10 of the invention is thus arranged and dimensioned in such a manner that, by co-operating firstly with the lid 3 that exerts merely the action of its weight on it, and secondly with the vessel 2 that forms a retaining abutment opposing falling of said lid, said sealing gasket automatically positions the first locking member 6 relative to the second locking member 8 with vertical operating clearance j that enables said first locking member 6 to be engaged or inserted under the second locking member 8 without jolting or friction.

Thus, merely by placing the lid 3 on the vessel 2 and by releasing said lid, it is possible to ensure that it is vertically positioned in such a manner that subsequent acting on the locking means 5, and in particular moving of the first locking member 6 relative to the second locking member 8 for closing the receptacle takes place freely without any forcing, and almost without encountering any resistance, thereby facilitating use of the utensil 1 and making it safer to use.

In particular, the user can thus actuate the locking means 5 without having to exert any additional downward vertical pressure on the lid, thereby avoiding damaging the gasket by applying excessive flattening stress to it, and thereby also limiting the risks of the cooking utensil 1 being acted on improperly, and in particular the risks of it being tipped over.

In addition, such a design for the gasket 10 and for the utensil 1 optionally guarantees to the user that all of the first locking members 6 are directly placed in appropriate manner and ready to be engaged under the second locking members 8, regardless of the number and of the distribution of said locking members 6, 8 around the peripheries of the lid and of the vessel, without it being necessary to pay any attention to any slight variations in trim that might affect the lid 3 when said lid is placed on the vessel.

When the locking means are distributed around the utensil, the sealing gasket 10 makes it possible for all of the first locking members 6 to be pressed down simultaneously under their respective second locking members 8.

Figure 2:
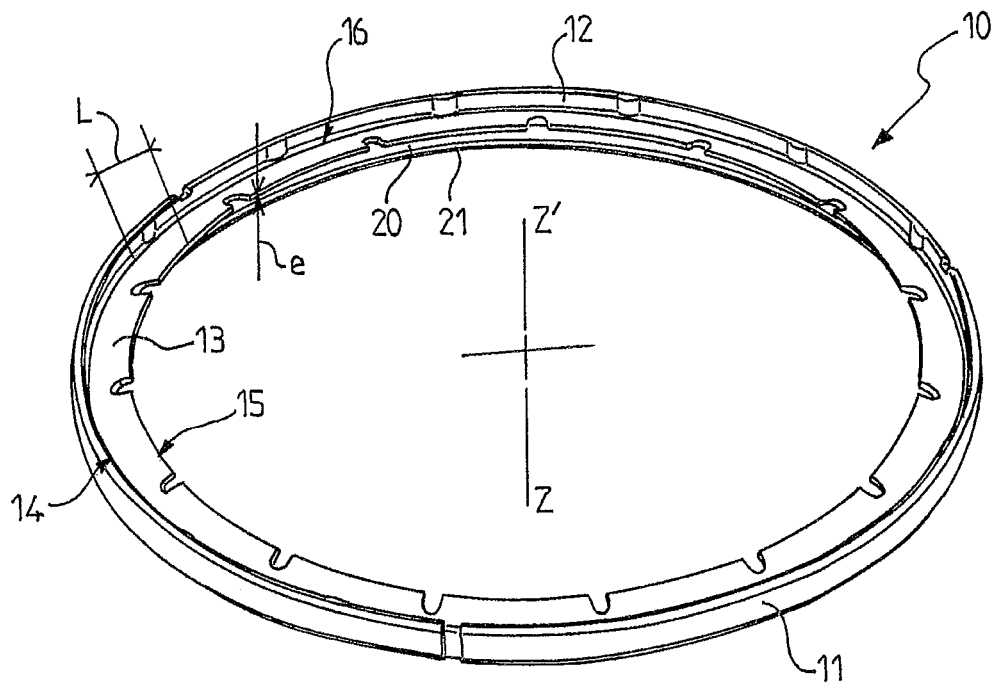
FIG. 2 is a three-dimensional view from below of the sealing gasket shown in FIG. 1.

A variant embodiment of a sealing gasket 10 of the invention is shown, in particular, in FIGS. 1 and 2, and placing it in the utensil 1 is shown in FIGS. 3 to 6.

Preferably, said sealing gasket is arranged to fit over the top rim 7 of the vessel, i.e. to straddle said top rim 7 between the inside of the vessel and the outside of the vessel, thereby improving its stability and possibly also contributing to automatically centering the lid on the vessel.

For this purpose, and as shown in FIGS. 1 to 6, the sealing gasket 10 may advantageously be provided with a preferably peripheral heel 11, which may advantageously be extended by a centering projection 12 that is substantially vertical, that is designed to come to be interposed between the laterally outer portion of the vessel rim 7 and the laterally inside face of the lid 3, and more particularly of the dropped edge 3D, in order to guarantee that the lid 3 is centered on the vessel 2.

In addition, the utensil 1 is preferably designed to enable the gasket to be mounted and held in the lid 3, including when said lid is separated from the vessel. To this end, the annular flat 3C preferably co-operates with the dropped edge 3D and with the rolled end segment 3E to define an annular channel inside which the sealing gasket 10, and more particularly its heel 11, is received.

Advantageously, the sealing gasket 10 is designed to be sandwiched vertically between the lid 3 and the vessel 2, and more particularly to be nipped between the annular flat 3 that overlies it and the high end of the vessel top rim 7 that retains it, in order to form a sort of resilient spacer suitable for deforming by being squeezed or flattened under the weight of the lid 3.

To this end, said sealing gasket 10 preferably has at least one flexible first lip 13 that projects from the heel 11 and that, by deforming, makes it possible for said gasket 10 to be pressed down under the weight of the lid 3.

In other words, said first lip 13, which is preferably arranged to come into contact with the top rim 7 of the vessel, is designed to be sufficiently flexible to absorb at least some of, and preferably most of, or indeed all of the deformation necessary for enabling the gasket 10 to reduce its interposition dimension H when it is subjected to the weight of the lid 3, so as to enable the first locking member 6 to pass under the second locking member 8.

The term "interposition dimension H" is used to mean the vertical extent of obstruction that the sealing gasket 10 opposes to the lid 3 coming closer to the top rim 7 of the vessel 2, and more particularly the spacing distance between the top rim of the vessel 7 and the annular flat 3C of the lid 3, as determined by the apparent thickness of said gasket at this place.

Figure 4:
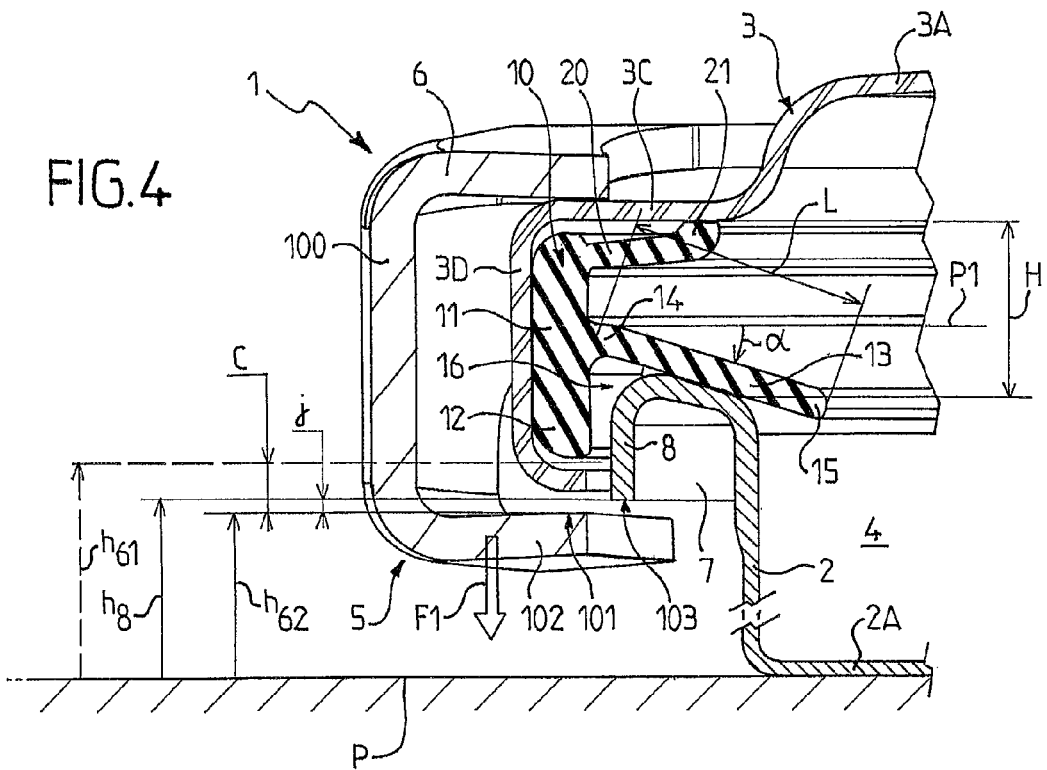
FIG. 4 is a section view showing the configuration of the utensil shown in FIG. 3 when the lid is placed on the vessel and released by the user, so as to rest thereon under its own weight.

Advantageously, as shown in particular in FIGS. 3 and 4, the vertical compression of the gasket takes place spontaneously under the effect of the weight of the lid by the first lip 13 flexing.

In particularly preferable manner, as shown in particular in FIGS. 1 to 6, the flexible first lip 13 forms a flexible skirt that projects from the peripheral heel 11 towards the inside of the gasket 10.

Thus, said first lip 13 has at least one component of inward radial extension between its root 14 that connects it to the heel 11 and its free end 15.

Advantageously, said root 14 forms a sort of hinge relative to which the flexible skirt is hinged so as to act as a spring blade that suspends the lid 3 resiliently relative to the vessel 2.

Preferably, the sealing gasket 10 of the invention is also of substantially circular shape, its various portions, and in particular the heel 11 and the first lip 13, preferably being substantially circularly symmetrical about a vertical axis (ZZ').

Naturally, the invention is in no way limited to a particular shape of gasket, which can match any particular shape of cooking utensil 1, and more particularly any particular shape of vessel rim 7, and, in particular, may have a general geometrical shape that is substantially oval, square, or of any other appropriate type.

Advantageously, the flexible skirt 13 comes into contact with the cooking utensil, and preferably with the vessel 2, in the manner of a continuous resilient ring that comes to create a substantially annular sealed contact zone over the entire top periphery of the vessel 2, thereby making it possible to guarantee excellent sealing for the cooking enclosure 4 by compensating, whenever necessary, for certain imperfections in the surface state of the vessel rim 7 or for any offsets in positioning of the gasket 10 due to the manufacturing or assembly tolerances of the utensil 1.

Naturally, the person skilled in the art is capable of determining the thickness e of the first lip 13, as a function of the material used to manufacture the gasket, in order to impart to it the flexibility necessary for enabling the first locking member 6 to cross the vertical threshold formed by the second locking member 8, as a function of the weight of the lid 3.

Preferably, said thickness e lies in the range 1 millimeter (mm) to 3 mm, and preferably lies in the vicinity of 1.8 mm.

Particularly preferably, in addition, the lip 13 has a thickness e that is substantially constant from its root 14 to its free inner end 15.

Preferably, the lip 13 extends substantially rectilinearly from its root 14 to its free end 15, thereby defining top and bottom faces that are substantially plane and preferably substantially mutually parallel.

In addition, the length L of said first lip 13, as measured between its root 14 and its opposite free end 15, is determined as a function, in particular, of the relative dimensions of the vessel 2 and of the lid 3, and more particularly of the relative dimensions of the vessel rim 7 or of the peripheral rim 3A, and also of the resilience that is to be imparted to the sealing gasket 10.

By way of example, and in particular for the above-mentioned range of thicknesses, said length L substantially lies in the range 5 mm to 15 mm, and preferably lies in the vicinity of 13 mm.

Preferably, at least when the gasket 10 is at rest, the first lip 13, has a substantially plane structure that is inclined, downwards in FIGS. 1 and 3 to 6, at an angle a substantially lying in the range 20° to 50°, and preferably lying in the vicinity of 35°, relative to the horizontal plane P1 of the gasket, itself substantially parallel to the work surface P.

Preferably, the gasket 10 is dimensioned in such a manner as also to maintain a non-zero angle α, i.e. a deflection of the first lip 13 relative to the horizontal plane P1 of the gasket preferably substantially lying in the range 10° to 30° when it is loaded, i.e. when it is subjected to the weight of the lid prior to bringing the utensil up to pressure.

Advantageously, said angle firstly imparts the spring effect to the first lip 13 on approaching the vessel rim 7, and also enables said first lip 13 to co-operate with the centering projection 12 and with the heel 11 to define a clearance zone 16 of substantially flared section into which the vessel rim 7 comes to be received when said rim comes into contact with the bottom surface of said first lip 13.

In accordance with the invention, the gasket 10 may therefore be provided with a clearance zone 16 forming a setback that is preferably in the form of an annular groove that is open facing downwards, e.g. a substantially U-shaped or V-shaped groove, into the hollow of which setback the top rim 7 of the vessel penetrates.

Advantageously, said clearance zone 16 imparts a self-centering property to the sealing gasket 10, and therefore to the lid 3, and enables said lid to come to fit over the vessel while substantially covering the top rim 7 in particularly stable, accurate, and reproducible manner. In particular, such an arrangement automatically and immediately ensures that the lid 3 is centered, that the gasket 10 and said lid 3 are held to a certain extent in transversely lateral manner relative to the vessel 2, and that trim is defined for the lid and is held angularly (in pitching and in roll), which trim is adapted to locking said lid.

Preferably, the lid 3 has a mass substantially lying in the range 1 kilogram (kg) to 3 kg, which corresponds to a weight of approximately in the range 10 newtons (N) to 30 N. Naturally, these values are in no way limiting, the person skilled in the art being capable of dimensioning the gasket 10 or any other element of the cooking utensil 1 depending on the use and capacity that are desired therefor.

Preferably, the working vertical stroke C allowed by the sealing gasket 10, i.e. the difference between the first height $h_{61}$ at which the first locking member 6 is situated when the sealing gasket 10 finds itself substantially at rest and the second height $h_{62}$ at which said first locking member 6 is situated when the sealing gasket 10 is subjected only to the stress of the weight of the lid 3 lies substantially in the range 2 mm to 8 mm, and preferably lies in the vicinity of 5.5 mm.

Preferably, the operating clearance j resulting from the gasket 10 being pressed down, and more particularly the minimum vertical distance between the top bearing face of the first locking member 6 and the bottom bearing face of the corresponding second locking member 8 lies substantially in the range 1 mm to 3 mm.

In addition, the vertical stroke C allowed by said sealing gasket 10 is preferably such that it corresponds to a proportion of the gasket that is pressed down vertically, i.e. to a ratio between the interposition dimension H of said gasket when said gasket is pressed down under the weight of the lid, as shown in FIG. 4, and the same interposition dimension H when said gasket is at rest, as shown in FIG. 3, which ratio lies in the range 0.50 to 0.80, and preferably lies in the vicinity of 0.65 (i.e. pressing down of about one third).

Preferably, the sealing gasket 10 of the invention is provided with a second lip 20 that projects from the same heel 11 as the first lip 13 and that has vertical deformation stiffness that is greater than the vertical deformation stiffness of the first lip, i.e. it has apparent vertical stiffness greater than the apparent vertical stiffness of said first lip.

Said first lip may thus preferably constitute a single deformation element enabling the gasket to be pressed down operationally.

Preferably, this second lip 20 forms a top lip designed to bear against the annular flat 3C of the lid 3, preferably at an end bead 21, thereby providing reinforced sealing between said lid 3 and the gasket 10.

Preferably, said second lip 20 is continuous and mounted substantially in opposition relative to the first lip 13, in such a manner that the gasket has a substantially divergent V-shaped cross-section.

The gasket 10 of the invention thus preferably has a structure that is substantially asymmetrical made up of a flexible first lip 13 and of a stiffer second lip 20 that is superposed above said first lip 13, and that is preferably shorter than said first lip.

Advantageously, this asymmetrical structure enables the gasket to behave differently depending on whether it is mounted the right way up or the wrong way up in the lid, in particular insofar as it has resistance to compression, and thus resistance to the lid being pushed vertically onto the vessel, that is considerably greater when it is mounted the wrong way up, so that its second lip 20 then comes to bear against the top rim 7 of the vessel, than when it is mounted the right way up, as appropriate for it to operate normally.

Thus, if a user mounts the sealing gasket 10 the wrong way up, the abnormal behavior of the pressure cooker on closure makes it possible to warn said user that it is necessary to take said gasket out and put it back in properly.

In particularly advantageous manner, the sealing gasket 10 of the invention is formed in once piece of an elastomer material, and preferably of silicone.

Operation of a cooking utensil 1 of the invention is described below, with preferred reference firstly to a first variant embodiment shown in FIGS. 3 to 6, which is provided with locking means having jaws, and secondly to a second variant embodiment corresponding to FIGS. 7 to 10, which is provided with a locking system having bayonet fittings.

Initially, the vessel 2 is standing on the work surface P, the lid 3 being separate and being fitted with the sealing gasket 10, which gasket is advantageously inserted in the annular channel in said lid, the back of the heel 11 coming to bear against the dropped edge 3D while the bead 21 of the top lip 20 comes to bear against the annular flat 3C, which flat forms a shoulder constituting a vertical retaining abutment for abutting against said gasket 10.

The user then takes hold of the lid 3 and mounts it on the vessel 2 in a substantially vertical and downward approach movement.

In doing so, the user causes the lid to progress until the first lip 13 comes into contact with the top rim 7 of the vessel, the gasket thus touching both the vessel and the lid substantially without being stressed, and especially without being flattened, as shown in FIG. 3.

So long as the lid is retained by the user, the gasket 10 substantially keeps its rest shape, as shown in FIGS. 3 and 7, the first locking member 6, and more particularly the top face 101 of the jaw 102 or the top face 200 of the lid ramp 201, finding themselves at a first height $h_{61}$ greater than or equal to the height at which the second locking member 8 is situated, which member is the bottom face 103 of the vessel rim 7 in the variant shown in FIG. 3, or the bottom face 202 of the vessel ramp 203 shown in FIG. 7.

It should be noted that the cooking enclosure 4 is advantageously sealed as soon as the first lip 13 comes to rest against the inside face of the vessel top rim 7 by forming a substantially annular sealing band.

Thus, the creation of the sealing and the implementation of the guidance of the lid may take place particularly early in the downward movement of the lid 3 onto the vessel 2, without hindering placement of said lid. Sealing and guidance may also then be reinforced by the gasket 10 being pressed down. Closure of the utensil 1 is thus particularly reliable, reproducible, and intuitive.

In addition, the gasket 10 may advantageously form a buffer pad that prevents the lid 2 and the top rim 7 of the vessel from colliding with each other.

In this position of initial contact with the vessel, and so long as the user retains the lid, said user cannot cause the locking means 5 to be closed directly, because the second locking member 8 forms a mechanical obstacle to the corresponding movement of the first locking member 6.

It then suffices for the user to release the lid, in such a manner that said lid continues to move down vertically against the sealing gasket 10, via which it finds itself, as it were, freely suspended in "floating" manner above the vessel 2, as shown in FIGS. 4 and 8.

By ceasing to compensate for the weight of the lid 3, the user enables said lid to exert natural compression stress, on the sealing gasket 10, due merely to its weight, which stress is substantially predetermined and reproducible and spontaneously causes said gasket to be pressed down resiliently, and more particularly, mostly, causes the first lip 13 to be pressed down resiliently.

This depressing of the gasket is accompanied by a controlled movement of the lid 3 that moves down towards, or even penetrates into, the vessel 2 in a substantially vertical downward movement F1, i.e. it moves closer to the bottom of the vessel 2A, so that the first locking member 6, which is secured to or integral with said lid 3, moves down so that the height $h_{61}$ at which it is situated decreases until it reaches a second height $h_{62}$ that is less than the first height $h_{61}$ and above all that is less that the height $h_8$ at which the second locking member 8 is situated, which second member preferably remains stationary at a substantially constant height $h_8$.

In other words, by means of the reaction of the gasket 10 to the weight of the lid 3, the first locking member 6 advantageously crosses the vertical threshold formed by the second locking member 8, thereby automatically placing it in a situation of circumventing the obstacle initially formed by said second locking member 8 and more particularly in a situation of being able to engage thereunder.

Advantageously, most if not all of the working stroke C allowed by the gasket is obtained by the first lip 13 being deflected resiliently about its root 14, this deflection gradually reducing the angle α and therefore the interposition dimension H at which the gasket acts in the manner of a compressible wedge or shim to maintain the spacing between the top rim 7 of the vessel and the annular flat 3C of the lid 3, which spacing is not zero in this example.

In particularly advantageous manner, the sealing gasket 10 also contributes to centering the lid 3 on the vessel, because it engages substantially simultaneously on either side of the vessel top rim 7, the first lip 13 forming a sort of penetration truncated cone that penetrates into the vessel 2 by sliding on the top rim 7, while the centering projection 12 stays outside said top rim 7, said rim 7 thus going, preferably gradually, into the clearance zone 16 provided for that purpose.

Advantageously, this centering phenomenon may be reinforced when the top rim 7 is inclined in gently sloping manner towards the inside of the vessel, as shown in FIGS. 3 to 6.

In addition, the combination, within the same particularly compact sealing gasket 10, of centering means and of depressible structures enabling said gasket to contract vertically under the weight of the lid, spontaneously and in simultaneous manner, guarantees that all of the locking means 6, 8 distributed over the periphery of the lid 3 and of the vessel 2 are positioned appropriately.

The lid 3 thus automatically takes up and maintains a trim that is substantially horizontal and balanced, adapted to acting on the locking means 5, in such a manner that, with the lid finding itself at a suitable height and substantially level, each first locking member does indeed find itself pre-positioned under the second locking member that corresponds to it, and that it is therefore not necessary for the user to check each pair of first and second locking members 6, 8 one by one before actuating the closure control.

Figure 9:
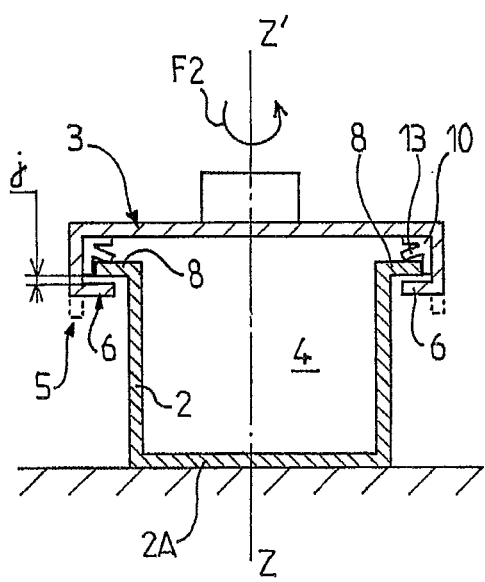

Once the lid has been placed spontaneously by it being released and by it gently compressing the sealing gasket 10, which takes up a depressed position, the user can then actuate the locking means 5, and more particularly cause them to undergo their closure movement F2, so as to cause them to go from their open state, shown in FIGS. 4 and 8, to their closure state, shown in FIGS. 5 and 9.

Depending on the situation, this operation is constituted either by causing the jaws 102 to move in a substantially horizontal and inward movement towards each other, and preferably in translation, e.g. by means of a central control knob, as shown in FIG. 5, or by causing the lid to turn about its vertical axis (ZZ') by means of a handle, in order to bring the lid ramps 201 into register with the vessel ramps 203 by a movement in rotation, as shown in FIG. 9.

In all situations, the pre-positioning of the first locking members 6 relative to the second locking members 8 enables said first locking members 6 to move F2 without being hindered by the second locking members 8, insofar the lid 3 being suspended has generated operating clearance j that enables said first locking members 6 to come to slide freely under said second locking means 8, in substantially overlapping manner and in register therewith.

Advantageously, the locking means 5 of the cooking utensil of the invention may advantageously be actuated, both for opening and for closure, firstly without it being necessary for the user to press the lid 3 and to push it further down because the operating clearance j required for operating the first locking members 6, and more particularly for snapping shut the jaws, appears from the outset, merely by the lid 3 being placed on the vessel 2, and secondly without the first locking members 6 coming into contact with said second locking members 8, and more particularly without said first locking members 6 having to exert any friction or stress against said second locking members 8, against the vessel 3, and/or against the gasket 10, while said first locking members 6 are moving.

The user can then place the utensil 1 on a heat source so as to cause the pressure to build up inside the cooking enclosure 4.

It is remarkable that, while this is happening, the lid 3 may lift slightly under the effect of said pressure, and take up the operating clearance j initially allowed for enabling the first locking members 6 to pass under the second locking members 8.

Figure 10:
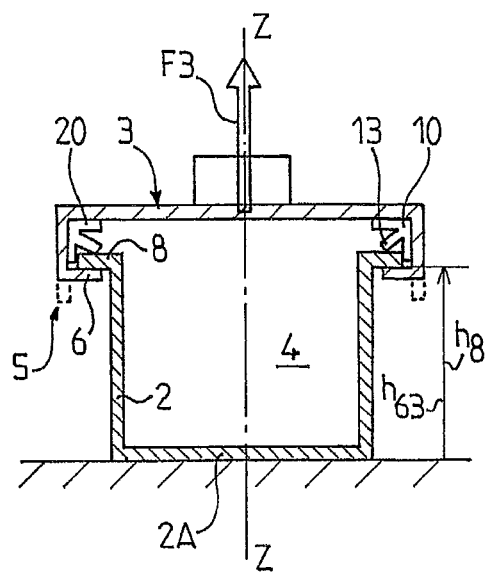

Thus, as is shown in FIGS. 6 and 10, said first and second locking members move closer together to come into contact with each other, the second locking members 8 then acting as an abutment against the first locking members 6 in order to retain the lid 3 firmly against the vessel.

Advantageously, the sealing gasket 10 then deforms so as to go from a depressed configuration to an intermediate configuration, by redeploying in part so as to accompany the lifting of the lid 3 while maintaining the sealing of the cooking enclosure 4.

More particularly, the upward vertical movement F3 of the lid 3, over a stroke that corresponds substantially to the initial operating clearance j, releases a fraction of the stresses that forced the first lip 10 to flex, so that said first lip returns resiliently to an angle α significantly greater than the angle it had when the lid was released, and significantly less than the angle it had at rest.

During the cooking stage, the first locking means 6 thus advantageously take up an intermediate third height $h_{63}$, between the first height and the second height, and preferably substantially equal to the height $h_8$ at which the second locking members 8 are situated.

It can also be observed that, during its alternate flexing and unflexing under the effect of the weight of the lid and then under the effect of the internal pressure, the first lip 13 significantly changes the radial position of the sealed contact zone that it forms with the top rim 7 of the vessel, which rim "rolls", as it were, along the bottom face of said lip 13 while moving said contact zone away from the center of the vessel as said lip straightens up, and while moving said contact zone towards the center of the vessel as said lip tilts.

At the end of cooking, the utensil is cooled and/or emptied of its steam, in such a manner that, with the lid no longer being held up by the internal pressure of the cooking enclosure, said lid is pressed down again to resume the configuration it occupied in FIGS. 4, 5, 8 and 9. The user can then actuate the locking means to move them in the opening direction so as to separate the lid 3 from the vessel 2.

Naturally, it is also possible, without going beyond the ambit of the invention, for the gasket 10 to be received permanently in the vessel 2 rather than in the lid 3 and/or for the flexible first lip 13 to be placed in a top position.

Advantageously, the sealing gasket 10 of the invention makes it possible to impart to the cooking utensil 1 predictable and reproducible behavior, and good ergonomics, and the property of being particularly intuitive and simple to use, because it suffices for the user to position the lid approximately on the vessel in order to be sure that said lid is suitably centered and that all of the locking members are appropriately pre-positioned, and finally that the cooking enclosure 4 is sealed.

In addition, the above-described constructional provisions advantageously make it possible to avoid the user having to exert excessive stresses on the gasket or on the locking means with the risk of damaging the utensil, of compromising its sealing, or indeed of tipping it over during the opening and closure operations.

Therefore, the present invention significantly improves the operating safety and the longevity of the cooking utensil 1.

Susceptibility Of Industrial Application

The invention is industrially applicable to designing and manufacturing pressure cookers and gaskets for pressure cookers.

The invention claimed is:

1. A sealing gasket for a cooking utensil for cooking food under pressure, said utensil comprising:
   a vessel and a lid that is designed to be mounted on said vessel to define a cooking enclosure; and
   locking means for holding the lid on the vessel, said locking means comprising at least one first locking member that is secured to or integral with the lid and at least one second locking member that is secured to or integral with the vessel, the first locking member configured to be engaged under the second locking member, after the lid has been placed on the vessel, in order to hold said lid on said vessel,
   the sealing gasket being designed to be interposed between the lid and the vessel in order to seal the cooking enclosure, wherein said sealing gasket is arranged to fit over and engage the top rim of the vessel and configured so that, while the lid is docking with the vessel, said sealing gasket comes firstly into simultaneous contact with said lid and with said vessel while the first locking member is situated at a first height ($h_{61}$) greater than or equal to the height ($h_8$) at which the second locking member is situated, and is then depressed under a weight of the lid alone to bring the first locking member to a second height ($h_{62}$) that is less than the height ($h_8$) at which the second locking member is situated,
   wherein the sealing gasket has at least one flexible first lip being engaged to said top rim of said vessel, that projects from a heel and that, by deforming, makes it possible for said sealing gasket to be pressed down under the weight of the lid, and wherein the sealing gasket has a second lip projecting from the same heel as the first lip and has vertical deformation stiffness that is greater than a vertical deformation stiffness of said first lip.

2. The sealing gasket according to claim 1, wherein a centering projection is provided that is configured to be interposed between a laterally outer portion of the vessel rim and an inside face of a dropped edge of the lid.

3. The sealing gasket according to claim 1, wherein the heel is peripheral and the flexible first lip forms a flexible skirt that projects from said heel towards an inside of the gasket.

4. The sealing gasket according to claim 1, wherein the first lip has a thickness substantially lying in the range 1 mm to 3 mm.

5. The sealing gasket according to claim 1, wherein, when the gasket is at rest, the first lip has a substantially plane structure that is inclined relative to the horizontal plane of the gasket at an angle substantially lying in the range 20° to 50°.

6. The sealing gasket according to claim 2, wherein a first lip and the centering projection define a flared clearance zone in which the vessel rim comes to be received.

7. The sealing gasket according to claim 1, wherein the gasket is configured to engage simultaneously on either side of the vessel top rim.

8. The sealing gasket according to claim 1, wherein the gasket allows the first locking member to travel over a working vertical stroke substantially lying in the range 2 mm to 8 mm.

9. The sealing gasket according to claim 1, wherein the gasket is made in one piece and of silicone.

10. A cooking utensil for cooking food under pressure, wherein the utensil is provide with a sealing gasket according to claim 1, and wherein the gasket is provided with one of:

locking means having jaws, the first locking member being formed by a top face of an inwardly-extending bottom edge of the jaw, and the second locking member being formed by a bottom face of the vessel rim or by a ramp; and bayonet-fitting locking means, the first locking member being formed by top faces of lid ramps or tabs, and the second locking member being formed by bottom faces of vessel ramps.

11. A cooking utensil for cooking food under pressure, wherein the utensil is provided with a sealing gasket according to claim 1, and wherein the utensil is provided with a plurality of first and second locking members that are distributed around said utensil, and wherein the sealing gasket enables all of the first locking members to be pressed down simultaneously under their respective second locking members.

12. The sealing gasket according to claim 2, wherein the gasket has at least one flexible first lip that projects from a heel and that, by deforming, makes it possible for said gasket to be pressed down under the weight of the lid.

13. The sealing gasket according to claim 4, wherein the thickness of the first lip is about 1.8 mm.

14. The sealing gasket according to claim 5, wherein the inclination angle of the first lip is about 35°.

15. The sealing gasket according to claim 8, wherein the working vertical stroke of the first locking member is about 5.5 mm.

16. The cooking utensil for cooking food under pressure according to claim 11, wherein the utensil is provided with a plurality of first and second locking members that are distributed around said utensil, and wherein the sealing gasket enables all of the first locking members to be pressed down simultaneously under their respective second locking members.

* * * * *